United States Patent
Leitner et al.

(10) Patent No.: US 12,247,275 B2
(45) Date of Patent: Mar. 11, 2025

(54) METHOD FOR THE ADDITIVE MANUFACTURING OF AN OBJECT FROM A MARAGING STEEL POWDER

(71) Applicant: voestalpine BOHLER Edelstahl GmbH & Co. KG, Kapfenberg (AT)

(72) Inventors: Harald Leitner, Kindberg (AT); Klaus Sammt, Spielberg (AT); Horst Zunko, Langenwang (AT)

(73) Assignee: voestalpine BOHLER Edelstahl GmbH & Co. KG, Kapfenberg (AT)

( * ) Notice: Subject to any disclaimer, the term of this patent is extended or adjusted under 35 U.S.C. 154(b) by 1122 days.

(21) Appl. No.: 16/956,731

(22) PCT Filed: Dec. 19, 2018

(86) PCT No.: PCT/EP2018/085788
§ 371 (c)(1),
(2) Date: Jun. 22, 2020

(87) PCT Pub. No.: WO2019/121879
PCT Pub. Date: Jun. 27, 2019

(65) Prior Publication Data
US 2023/0220527 A1 Jul. 13, 2023
US 2023/0392243 A2 Dec. 7, 2023

(30) Foreign Application Priority Data
Dec. 22, 2017 (DE) .................... 10 2017 131 218.8

(51) Int. Cl.
*C22C 38/50* (2006.01)
*B22F 10/14* (2021.01)
(Continued)

(52) U.S. Cl.
CPC .............. *C22C 38/50* (2013.01); *B22F 10/14* (2021.01); *B22F 10/28* (2021.01); *B22F 10/64* (2021.01);
(Continued)

(58) Field of Classification Search
CPC ......... C22C 38/02; C22C 38/04; C22C 38/06; C22C 38/42; C22C 38/44; C22C 38/50;
(Continued)

(56) References Cited

U.S. PATENT DOCUMENTS 5,035,855 A 7/1991 Utsunomya et al.
5,202,089 A 4/1993 Norstrom et al.
(Continued)

FOREIGN PATENT DOCUMENTS

CN 106825566 A 6/2017
DE 2813736 A1 10/1978
(Continued)

OTHER PUBLICATIONS

English language machine translation of JP-2006328486-A. Generated Sep. 8, 2023. (Year: 2023).*
(Continued)

*Primary Examiner* — Brian D Walck
(74) *Attorney, Agent, or Firm* — Maxwell J. Petersen; FisherBroyles, LLP

(57) ABSTRACT

The present invention relates to a method for producing an article out of a maraging steel, wherein the article is successively subjected to a solution annealing and heat treatment, wherein the steel has the following composition in Wt.-%:
C=0.01-0.05
Si=0.4-0.8
Mn=0.1-0.5
Cr=12.0-13.0

(Continued)

Ni=9.5-10.5
Mo=0.5-1.5
Ti=0.5-1.5
Al=0.5-1.5
Cu=0.0-0.05
Residual iron and smelting-induced impurities.

25 Claims, 8 Drawing Sheets

(51) Int. Cl.
    *B22F 10/28*     (2021.01)
    *B22F 10/64*     (2021.01)
    *B33Y 10/00*     (2015.01)
    *B33Y 70/00*     (2020.01)
    *C22C 38/02*     (2006.01)
    *C22C 38/04*     (2006.01)
    *C22C 38/06*     (2006.01)
    *C22C 38/42*     (2006.01)
    *C22C 38/44*     (2006.01)

(52) U.S. Cl.
    CPC .............. *B33Y 70/00* (2014.12); *C22C 38/02* (2013.01); *C22C 38/04* (2013.01); *C22C 38/06* (2013.01); *C22C 38/42* (2013.01); *C22C 38/44* (2013.01); *B33Y 10/00* (2014.12)

(58) Field of Classification Search
    CPC ......... B33Y 70/00; B33Y 10/00; B22F 10/14; B22F 10/28; B22F 10/64
    See application file for complete search history.

(56) References Cited

U.S. PATENT DOCUMENTS

| | | |
|---|---|---|
| 5,855,844 A | 1/1999 | Martin |
| 6,238,455 B1 | 5/2001 | Brown et al. |
| 2012/0321478 A1 | 12/2012 | Oikawa et al. |
| 2013/0065073 A1* | 3/2013 | Fuwa ...................... B22F 10/36 428/548 |
| 2013/0224033 A1* | 8/2013 | Arai .......................... F01D 5/28 416/223 R |

FOREIGN PATENT DOCUMENTS

| | | |
|---|---|---|
| DE | 3427602 A1 | 2/1985 |
| DE | 69115356 T2 | 5/1996 |
| DE | 69824419 T2 | 2/1999 |
| DE | 60002745 T2 | 5/2001 |
| DE | 102007056259 A1 | 4/2009 |
| EP | 2546383 A1 | 1/2013 |
| EP | 2617856 A1 | 7/2013 |
| EP | 2631432 B1 | 8/2013 |
| EP | 2682484 A2 | 1/2014 |
| EP | 3109033 A1 | 12/2016 |
| GB | 1551029 A | 8/1979 |
| JP | 56108860 A | 8/1981 |
| JP | 856108660 A | 8/1981 |
| JP | 2002310339 | 12/1990 |
| JP | 2006328486 A * | 12/2006 |
| JP | 2013170559 A | 9/2013 |
| WO | 2017106029 A1 | 6/2017 |
| WO | 20170217913 | 12/2017 |
| WO | 20170217973 | 12/2017 |

OTHER PUBLICATIONS

English language machine translation of CN 106825566. Generated Sep. 8, 2023. (Year: 2023).*
International Search Report for PCT/EP2018/085788, dated Feb. 12, 2019.
Hoeges et al., "Development of a Maraging Steel Powder for Additive Manufacturing," GKN Metals Engineering GmbH (date unknown).
International Preliminary Examination Report for PCT/EP2018/085788, dated Jun. 23, 2020.

* cited by examiner

METHOD FOR THE ADDITIVE MANUFACTURING OF AN OBJECT FROM A MARAGING STEEL POWDER

The present invention relates to a method for producing a maraging steel according to the preamble to claim 1.

So-called maraging steels are steels whose alloy is virtually carbon-free.

The maraging steels on the one hand, have high strength and on the other, have good toughness along with good processing and welding properties. They are used as tool steels for use at elevated temperatures, e.g. with intricately shaped die-cast or injection-molded plastic tools and for producing knives and blades for the sport of fencing.

Examples of maraging steels are the hot-working steels 1.2709 and 1.6356.

DE 603 19 197 T2 has disclosed a maraging steel, which contains at most 0.01% C, 8 to 22% nickel, 5 to 20% cobalt, 2 to 9% molybdenum, between 0 and 2% titanium, at most 1.7% aluminum, between 0 and 10 ppm magnesium, less than 10 ppm oxygen, less than 15 ppm nitrogen, and the rest iron and random impurities; this maraging steel contains nitride inclusions with a maximum length of 15 μm and oxide inclusions with a maximum length of 20 μm; the oxide inclusions include spinel-type inclusions and aluminum oxide inclusions, and in the total content of spinel-type inclusions with a length of at least 10 μm and $Al_2O_3$ with a length of 10 μm, the percentage of spinel-type inclusions with a length of at least 10 μm is greater than 0.33. The intent of this is to take into account the objective of significantly reducing the non-metallic inclusions.

EP 1 222 317 B1 has disclosed a high-strength, stainless machining steel; it is produced by powder metallurgy and should contain a precipitation-hardenable stainless steel alloy; this alloy contains at most 0.03% carbon, at most 1% manganese, at most 0.75% silicon, at most 0.04% phosphorus, 0.01 to 0.05% sulfur, 10 to 14% chromium, 6 to 12% nickel, at most 6% molybdenum, at most 4% copper, 0.4 to 2.5% titanium, and other minor alloy additives; the rest should be composed of iron and the usual impurities; a powder metallurgy product is to be produced from this, which should contain a fine dispersion of tiny sulfide particles whose major dimension is no greater than about 5 μm. It can also be used to produce a wire.

EP 0 607 263 B1 has disclosed a precipitation-hardenable martensitic steel, which in addition to the usual small amounts of metals added to the alloy, also contains 10 to 14% chromium, 7 to 11% nickel, 2.5 to 6% molybdenum, and 0.5 to 4% copper; in this case, it can also contain up to 9% cobalt, the rest consisting of iron and the usual impurities.

EP 2 631 432 B1 has disclosed a steam turbine rotor, a corresponding steam turbine, and a turbine power plant; the steam turbine rotor is a steam turbine low-pressure last stage long blade, which is composed of a precipitation-hardenable martensitic stainless steel, which contains less than 0.1% carbon and 9 to 14% chromium as well as 9 to 14% nickel, 0.5 to 2.5% molybdenum, and 0.5% or less silicon.

In the meantime, so-called additive production processes have already become very widespread in the industrial sector. Particularly in the production of prototypes, additive production processes enjoy very widespread use today.

Additive production processes are production processes in which printing data are generated by means of CAD data or from CAD data and articles can be printed, for example from plastics, using suitable printers.

Such processes are also referred to as generative production processes.

With generative production processes, it is also possible to print metal powder, the latter frequently being produced in the so-called powder bed process. Suitable powder bed processes include selective laser melting (SLM), selective laser sintering (SLS), selective heat sintering (SHS), binder jetting, and electron beam melting (EBM).

In these methods, a powder bed is produced and in the regions in which an article is to be produced out of metal, energy is introduced with the corresponding means (laser or electron beam), which selectively melts the powder of the powder bed in that region. After the melting, another powder layer is applied and is in turn melted. The melting bonds this melted powder layer to the underlying powder layer, which has already been melted and solidified again or which is still in the molten phase, so that an article can be produced layer by layer, so to speak.

The object of the invention is to create a method for producing an article out of a maraging steel, which enables an optimal ratio of hardness to toughness.

The object is attained with the features of claim 1.

Advantageous modifications are disclosed in the dependent claims.

Another object is to produce an article out of a maraging steel, which has an optimal ratio of hardness to toughness.

This object is attained with the features of claim 8.

Advantageous modifications are disclosed in the claims that depend thereon.

Another object is to produce a steel powder for use in an additive production process, which produces an article with an optimal ratio of hardness to toughness.

The object is attained with the features of claim 11.

Advantageous modifications are disclosed in the claims that depend thereon.

In the maraging steels according to the prior art, either a high level of hardness or a high level of toughness can be achieved. A high level of toughness is possible particularly if the aging enables achievement of a high percentage of retransformed austenite. But this percentage of retransformed austenite in turn has a negative influence on the maximum achievable hardness.

According to the invention, an alloy concept has been discovered, which with a high level of hardness, nevertheless permits the achievement of a high level of toughness.

It has also been discovered according to the invention that a metal powder produced using the alloy concept according to the invention is printable and exhibits the required mechanical values after the aging alone so that an additional, usually required solution annealing step can be eliminated.

According to the invention, an alloy concept is used, which is essentially based on nickel, aluminum, titanium, and silicon as hardening elements.

In order to bring the hardness, strength, and toughness of the alloy into harmony at a high level, the focus was placed on two points, namely on the one hand, increasing the hardness and strength values by modifying precipitation densities and types. To accomplish this, according to the invention, the content of the precipitation-promoting elements aluminum and titanium was increased.

In order to increase the toughness, the percentage of retransformed austenite was increased, which was possible to achieve by increasing the nickel content.

The invention will be explained by way of example based on the drawings. In the drawings.

The following is a listing of the most important alloying elements and their influence on the microstructure and properties in maraging steels and in the invention in particular.

Nickel (Ni)

Nickel is the most important alloying element in maraging steels. Since the carbon content is low in maraging alloys, the addition of Ni to Fe results in the formation of a cubic Fe—Ni martensite. Controlling the Ni content is also important because Ni is an austenite-stabilizing element and Ni is thus decisive for the formation of retransformed austenite. Ni forms intermetallic precipitations with numerous elements such as Al, Ti, and Mn and therefore plays an additional decisive role as a precipitation-promoting element.

Aluminum (Al)

Aluminum is added to maraging steels as a precipitation element. It increases the solid solution strengthening and, particularly with Ni, forms intermetallic precipitations. A higher Al content can lead to the presence of δ ferrite in the microstructure, which has a negative impact on the mechanical properties and on the corrosion resistance.

Titanium (Ti)

Titanium appears to be one of the most active elements in maraging steels. It precipitates out during the aging and can be considered the most important alloying element for the formation of precipitations in maraging steels. It was used as a precipitation-promoting element in the first maraging steels that were developed and is used today in complex alloying systems.

Figure 1:
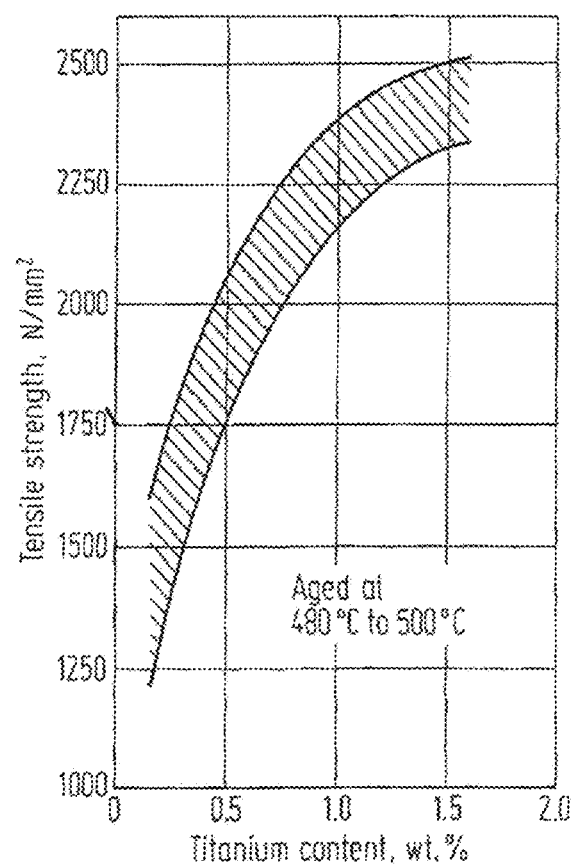
FIG. 1 shows the influence of the titanium content.

The greatest advantage is the rapid precipitation; titanium is thus much more active, for example, than Mo in C-type and T-type maraging steels in the early stages of precipitation. The enormous influence of the Ti content on the tensile strength 18% Ni and Co-containing maraging steels is shown in FIG. 1. In addition, small quantities of Ti are added to Ti-free maraging steels in order to form carbides. The objective is to bind to the carbon C so that no other precipitation elements can form carbides.

The influence of the Ti content is shown in FIG. 1.

Molybdenum (Mo)

Figure 2:
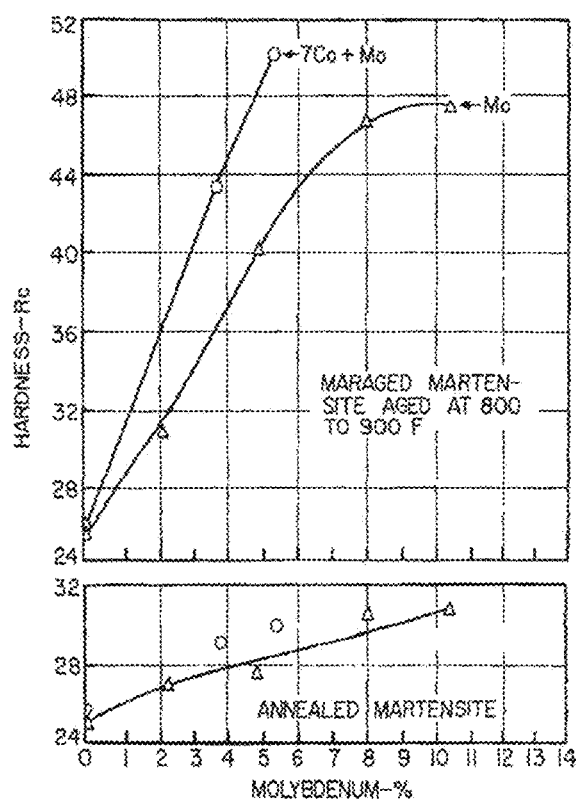
FIG. 2 shows the influence of the molybdenum content.

With an increasing Mo content, an increase in the hardness after aging can be observed (FIG. 2) since Mo forms intermetallic compounds with Ni. The precipitation behavior of Mo is strongly influenced by other elements, especially by cobalt (Co), among others. The addition of Co decreases the solubility of Mo in the matrix and Mo is also forced to form precipitations. This leads to an increase in the hardness (FIG. 2). Furthermore, Mo also increases the solid solution strengthening (FIG. 2) and improves the corrosion resistance of high Cr-containing maraging steels.

The influence of the Mo content is shown in FIG. 2.

Chromium (Cr)

Chromium is added to improve the corrosion resistance of maraging steels. This yields steels that can be used, for example, as plastic mold steels, which are exposed to a chemical attack during the production of plastics. The addition of Cr to the alloy promotes the precipitation of the Laves phase. But higher Cr contents can lead to the formation of the a phase, which has a negative effect on the mechanical properties. Furthermore, in long-term aging, spinodal segregation into Fe-rich and Cr-rich phases can occur, which reduces the notch impact strength.

Manganese (Mn)

In order to develop economical maraging steels, Mn was sometimes used to replace the more expensive Ni. Consistent with Ni, Mn forms a Mn martensite, but has less of an austenite-stabilizing effect and thus a significant quantity of δ ferrite is present in Fe—Mn alloys. This δ ferrite has a negative effect on the mechanical properties and on the corrosion resistance.

It is also already known that Mn forms intermetallic compounds with Fe and Ni.

Carbon (C)

Carbon is not an alloying element of a maraging steel. Because maraging steels cannot obtain their high strength from carbides, the carbon content is kept as low as possible during the production of the steel. For this reason, the carbon content of a maraging steel is in the range of 1/100%.

The corrosion resistance and the weldability deteriorate when carbon forms Cr-carbides in stainless maraging steels. In PH 13-8 Mo maraging steels, C forms carbides with Mo and Cr.

Copper (Cu)

Cu acts as a precipitation-promoting element in maraging steels; it does not, however, form a compound with other elements. At the beginning, it precipitates out with a cubic, body-centered structure in the Fe matrix. During the aging, it develops a 9R structure and in the end, it forms its cubic face-centered structure in equilibrium. The role of copper is to rapidly precipitate out and serve as a nucleation site for other precipitations.

Silicon (Si)

Silicon is usually considered an impurity element in steels. But in maraging steels, Si forms intermetallic phases and particularly in alloys that contain Ti, it forms the so-called $Ni_{16}Si_7Ti_6$ G phase. The term "G phase" is used because the phase was discovered for the first time at grain boundaries; this is not the case, however, in maraging steels.

The good mechanical properties of maraging steels can be attributed to a two-stage heat treatment.

Figure 3:
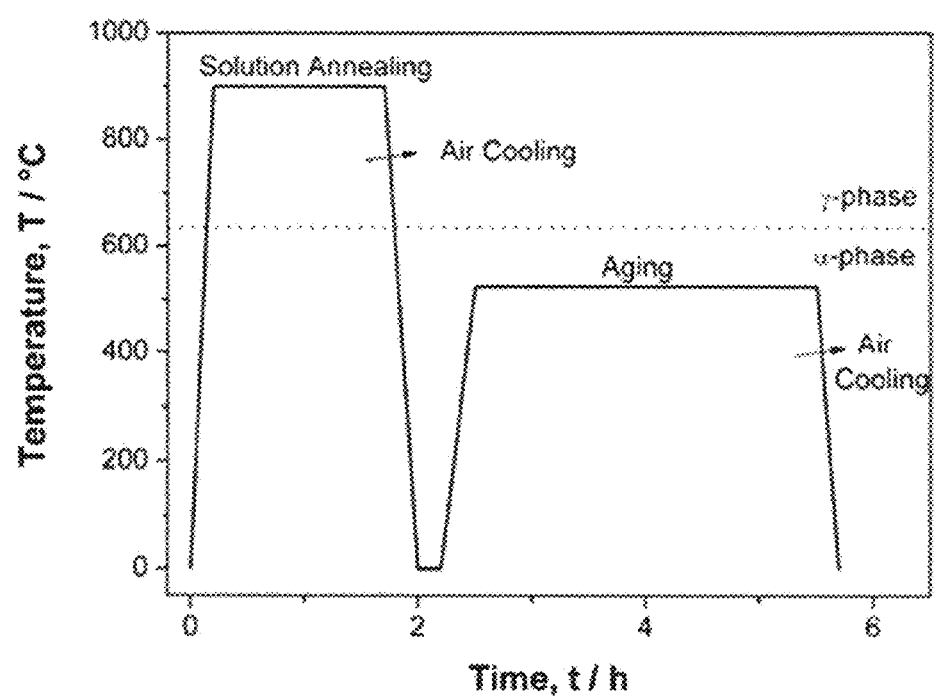
FIG. 3 shows a time/temperature diagram of a heat treatment, which consists of a solution and washing procedure followed by an air-cooling to room temperature and an aging process.

FIG. 3 shows an example of a time/temperature plan of such a heat treatment, which consists of a solution annealing procedure followed by an air-cooling to room temperature and an aging process.

Figure 4:
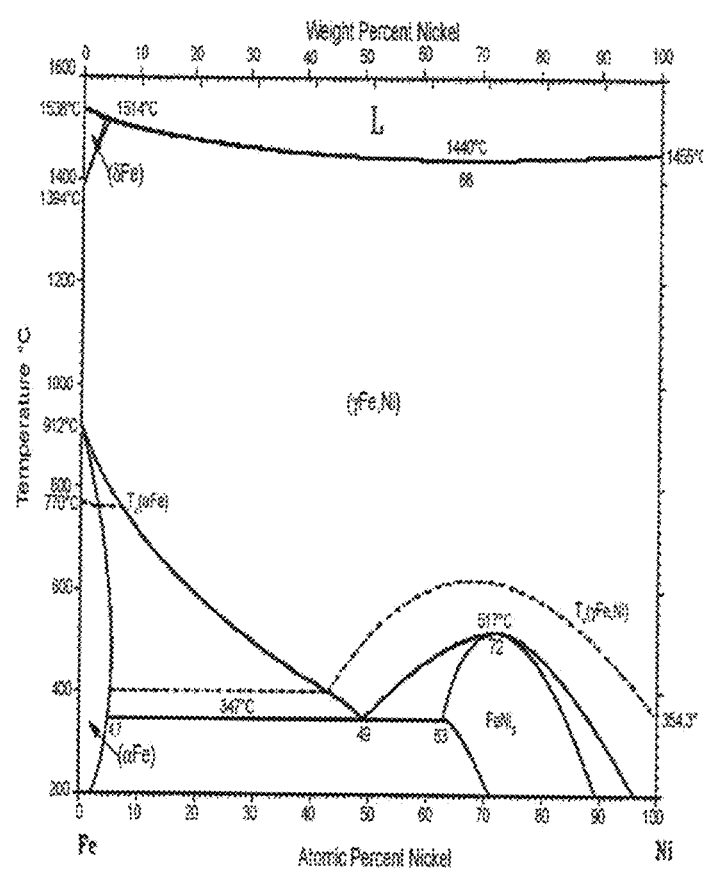
FIG. 4 shows the phase diagram of iron/nickel in equilibrium.

If after the solution annealing procedure, a quenching from the austenitic monophase field is carried out, then a soft, but powerfully distorted Ni-martensite is formed, which can be easily machined and cold-worked if need be. The subsequent aging is typically carried out in a temperature range of 400° C. to 600° C. During the aging process, three reactions occur:

(i) precipitation of intermetallic phases
(ii) recovery of martensite
(iii) formation of retransformed austenite The precipitation of high-nm intermetallic phases is responsible for the immense increase in strength after the aging. Maraging steels have a series of essential advantages:

only a two-stage heat treatment is required
complex shapes can be easily machined in the un-aged state
subsequent hardening with minimal deformation The phase diagram of Fe—Ni in equilibrium is shown in FIG. 4. It clearly shows that Ni decreases the conversion temperature from austenite to ferrite and that in the alloys that contain more than a few percent Ni, the structure in equilibrium at room temperature consists of austenite and ferrite.

However, in practice under real cooling conditions starting from the austenitic monophase, the material does not decompose into a composition of austenite and ferrite in equilibrium. Instead, the austenite, with further cooling, is transformed into a cubic martensite.

Figure 5:
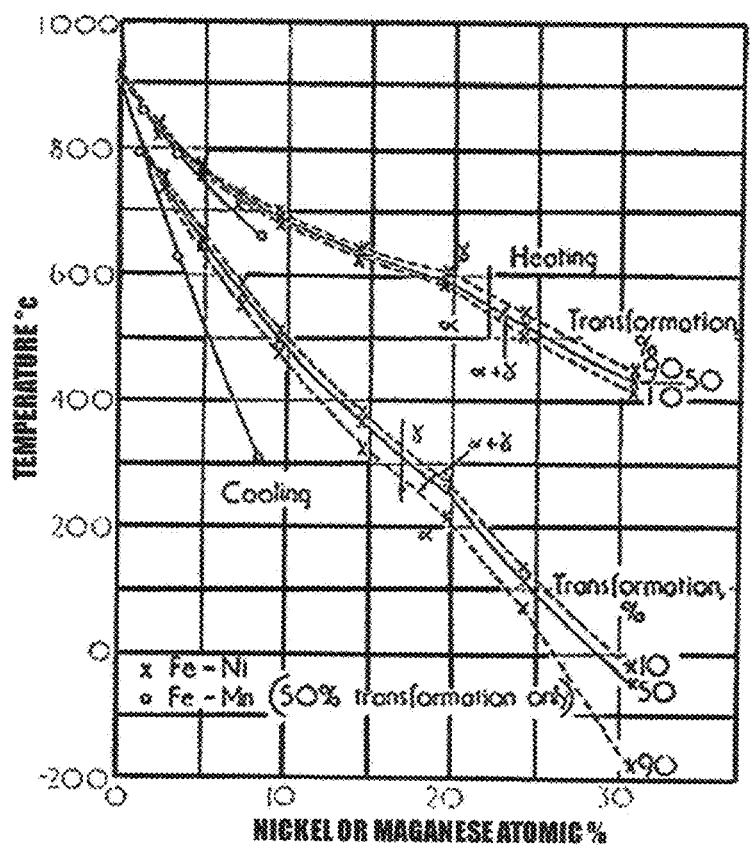
FIG. 5 shows the hysteresis of conversion temperatures of martensite and austenite during heating and cooling.

The aging of the martensitic structure is possible due to the influence of Ni in maraging steels, which leads to a hysteresis of the conversion temperatures of martensite and austenite during the heating and cooling (FIG. 5). With an increasing Ni content, the conversion temperature of heating and cooling decreases. In this connection, the difference between the conversion temperatures depends on the Ni content.

After the solution annealing, the material is transformed to a martensite if it is cooled to below the conversion temperature. Depending on the Ni content and the other alloying elements, a certain percentage of austenite can be retransformed at room temperature. If the microstructure is reheated again to below the α-γ conversion temperature, then the martensite decomposes into an equilibrium structure composed austenite and ferrite. The speed of this reconversion reaction depends on the temperature used. Fortunately in maraging steels, this conversion is slow enough that precipitations of the intermetallic phases from the oversaturated solution form before the reconversion reaction dominates.

If on the other hand, the alloy is heated to above the α-γ conversion temperature, then the martensite is retransformed due to annealing processes.

The alloy concept according to the invention is essentially based on a concept that is built on Ni, Al, Ti, and Si (see FIG. 6) as hardening elements.

In order to increase the hardness, strength, and toughness of the alloy, the focus of the alloy development was placed essentially on two points:

An increase in the hardness and strength values was achieved by modifying the precipitation densities and types. The contents of the precipitation-promoting elements Al and Ti were also increased.

In order to increase the toughness, the percentage of retransformed austenite was increased. It was possible to achieve this by increasing the Ni content.

By contrast with the above-mentioned conventional methods, in particular the two-stage heat treatment, it has turned out according to the invention that particularly in maraging powders according to the invention that have been printed using the laser melting process, the solution annealing step can be eliminated and the aging step alone ensures that the desired level of strength and toughness is achieved. This was not expected, is fairly surprising, and is accompanied by the advantage that now, only an aging treatment has to be carried out, which shortens the overall process and naturally also makes it more advantageous. This is very clear from FIG. 11, which shows that in the material according to the invention, the strength level and also the solution annealing are achieved.

The invention will be described in greater detail based on the examples below.

Figure 7:
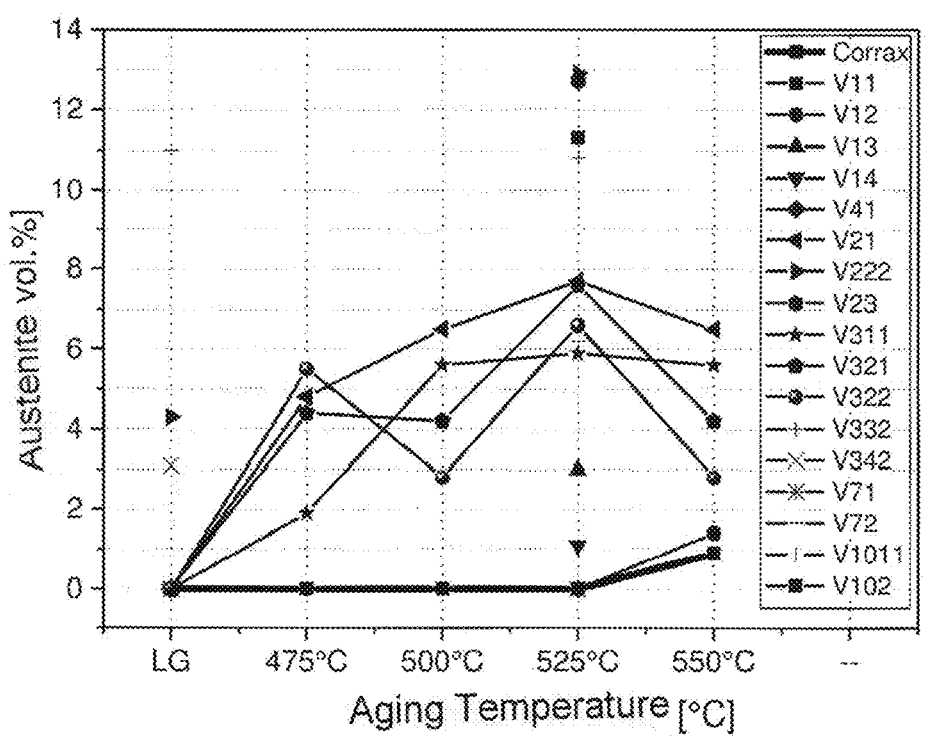
FIG. 7 shows the austenite content as a function of the aging temperature for different alloys.

A powder with chemical compositions according to FIG. 7 and a grain fraction of 15-45 μm is produced by means of gas atomization. To achieve this, bar stock, which has been melted in the vacuum induction furnace and possibly remelted by means of ESR (electroslag remelting) or VAR (vacuum arc remelting), is melted with the identical composition in a vacuum induction furnace and then atomized by means of inert gas (Ar, He, N). The powder fraction is adjusted by means of subsequent straining.

The resulting powder fraction is then processed to produce sample bodies in a 3D printer, which functions according to the principle of selective laser melting.

In the form of these sample bodies, the printed material is then characterized in different heat treatment states with regard to its structure, hardening/aging behavior, and mechanical properties.

In this example, the state "as printed+aged" is compared to the state "printed+solution annealed+aged."

The solution annealing was carried out at 1000° C. for 1 h and the aging was carried out 3 h at 525° C. The hardness was then determined using the Rockwell method. The mechanical properties were determined by means of tensile testing.

Figure 8:
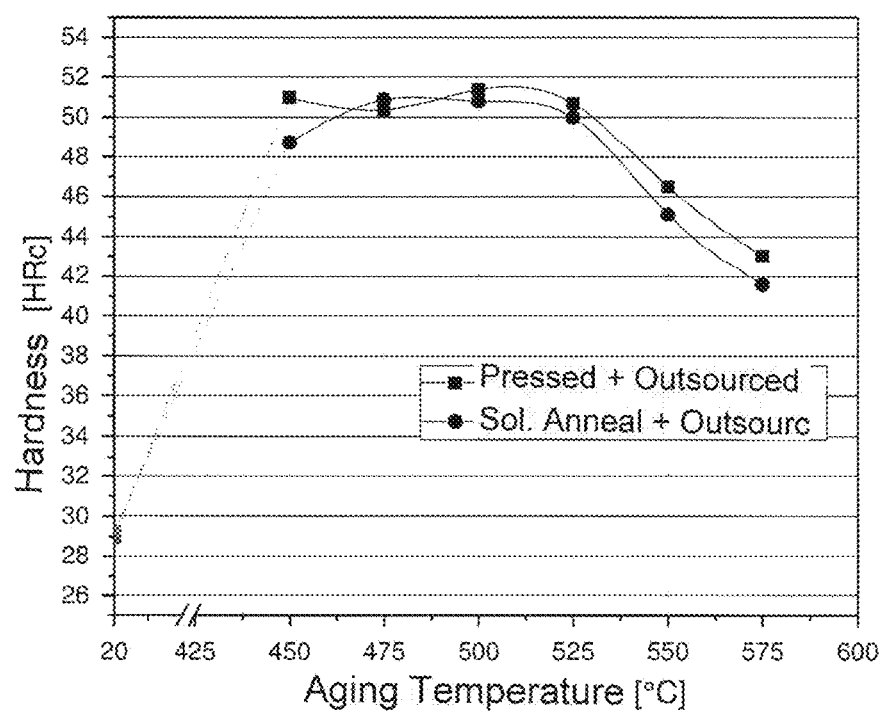
FIG. 8 shows the hardness curve as a function of the aging temperature in a printed, aged material according to the invention and in a solution annealed, aged material.

FIGS. 8 and 9 show the characteristic values of a plurality of alloys with regard to hardness and toughness.

Figure 6:
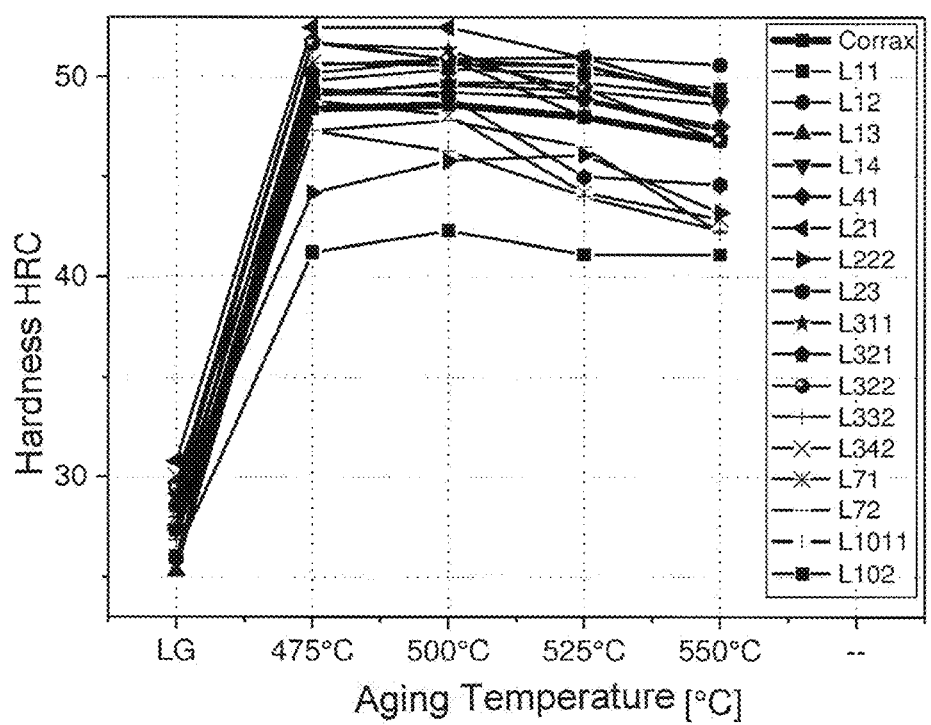
FIG. 6 shows the hardness as a function of aging temperature for different alloys.

In this connection, in both of these figures, the alloys V21, V311, V321, and V322 according to Table in FIG. 6 correspond to the alloys according to the invention.

FIG. 8 shows that the corresponding alloys according to the invention lie in the upper range of hardness of all of the alloys and thus have absolutely sufficient hardness properties.

FIG. 9 shows the percentage of austenite as a function of the aging temperature. In this case, different percentages of retransformed austenite were produced, the retransformed austenite being responsible for the toughness of the material. It is clear that the alloys according to the invention are all very close to one another, particularly with an aging temperature of 525° C., and the percentages of austenite are absolutely sufficient for the high level of toughness.

If one compares this to the comparison alloy, it is clear that there are indeed alloys that have a high percentage of austenite, but if this is compared to FIG. 8, it is clear that they fall short in terms of hardness. Other alloys have a significantly lower percentage of austenite or even no austenite whatsoever and are thus very poor in toughness, even though they are better in hardness.

It is therefore clear that the invention enables a particularly successful combination of hardness and toughness. In this case, the hardness after the aging is greater than 50 HRC.

As is also clear from FIG. 10, in a Ti-free variant that is not according to the invention, the results of the mechanical testing turn out differently between "printed+aged" and "printed+solution annealed+aged." The printed and aged material that is not according to the invention has mechanical properties that lag those of conventionally heat-treated, solution annealed, and aged material.

To achieve the best mechanical properties in these examples that are not according to the invention, after the printing, a solution annealing treatment is required before the aging.

As already stated, with the variant according to the invention (FIG. 11), it is clear that the printing and subsequent aging yields the desired result even without a solution annealing treatment.

Specific steel compositions of the invention are exemplified in Table 1 (below). Another composition of a steel powder according to the invention is exemplified in Table 2 (below).

TABLE 1

Steel Compositions

| alloy | C | Si | Mn | Cr | Ni | Mo | Ti | Al | Cu |
|---|---|---|---|---|---|---|---|---|---|
| V21 | 0.01 | 0.8 | 0.1 | 12.2 | 9.8 | 1 | 1.2 | 0.5 | 0.04 |
| V311 | 0.01 | 0.6 | 0.1 | 12.2 | 9.9 | 1 | 1 | 0.6 | 0.04 |
| V321 | 0.01 | 0.4 | 0.1 | 12.3 | 10.1 | 1 | 1 | 1.1 | 0.03 |
| V322 | 0.01 | 0.8 | 0.1 | 12.2 | 10.1 | 0.9 | 1 | 0.8 | 0.04 |

* values in wt.- %, Residual is iron

TABLE 2

Powder Compositions

| alloy | C | Si | Mn | Cr | Ni | Mo | Ti | Al | Cu |
|---|---|---|---|---|---|---|---|---|---|
| Min. | 0.01 | 0.4 | 0.1 | 12.0 | 9.5 | 0.5 | 0.5 | 0.5 | 0.0 |
| Max. | 0.05 | 0.8 | 0.5 | 13.0 | 10.5 | 1.5 | 1.5 | 1.5 | 0.05 |

Table 3 (below) shows the tensile strength and hardness values for printed, heat treated materials that are not according to the invention.

TABLE 3

Compositions Not Of The Invention

| | Rm | Rp02 | Hardness |
|---|---|---|---|
| As pressed + Outsourced | 1520 | 1430 | 47 |
| Solution annealed + Outsourced | 1640 | 1560 | 50 |

| alloy | C | Si | Mn | Cr | Ni | Mo | Ti | Al | Cu |
|---|---|---|---|---|---|---|---|---|---|
| V21 | 0.01 | 0.8 | 0.1 | 12.2 | 9.8 | 1 | 1.2 | 0.5 | 0.04 |
| V311 | 0.01 | 0.6 | 0.1 | 12.2 | 9.9 | 1 | 1 | 0.6 | 0.04 |
| V321 | 0.01 | 0.4 | 0.1 | 12.3 | 10.1 | 1 | 1 | 1.1 | 0.03 |
| V322 | 0.01 | 0.8 | 0.1 | 12.2 | 10.1 | 0.9 | 1 | 0.8 | 0.04 |

* values in wt.- %, Residual is iron

The invention claimed is:

1. A method for producing an article out of a maraging steel, comprising the steps of:
   providing a steel powder having the following composition in M-%:
   C=0.01-0.05
   Si=0.4-0.8
   Mn=0.1-0.5
   Cr=12.0-13.0
   Ni=9.5-10.5
   Mo=0.5-1.5
   Ti=0.5-1.5
   Al=0.5-1.5
   Cu=0.01-0.05
   Residual consisting of iron and smelting-induced impurities;
   forming an article from the steel powder using a powder additive production process;
   optionally solution annealing the article at a temperature exceeding 875° C.; and
   subjecting the article to an aging heat treatment to yield a hardness greater than 50 HRC and a retransformed austenite content of 4% to 8% by volume;
   wherein the hardness greater than 50 HRC is achieved both without the solution annealing, and with the solution annealing at a temperature exceeding 875° C.

2. The method according to claim 1, wherein the additive production process comprises selective laser melting (SLM), selective laser sintering (SLS), selective heat sintering (SHS), binder jetting, or the electron beam melting (EBM) method.

3. The method according to claim 1, wherein the steel powder has a grain size distribution of 5 to 150 μm.

4. The method according to claim 1, wherein the aging heat treatment is carried out at 475° C. to 525° C.

5. The method according to claim 1, wherein the aging heat treatment is carried out for 2 to 6 hours.

6. The method according to claim 1, wherein after the aging heat treatment, the article has a retransformed austenite content of between 4 and 8 vol. %.

7. The method of claim 1, wherein after the aging heat treatment, the article has a retransformed austenite content of 5 to 7 vol. %.

8. The method of claim 1, wherein the steel powder comprises:
   C=0.01-0.03.

9. The method of claim 1, wherein the steel powder comprises:
   Mn=0.1-0.3.

10. The method of claim 1, wherein the steel powder comprises:
    Cr=12.2-12.5.

11. The method of claim 1, wherein the steel powder comprises:
    Ni=9.8-10.2.

12. The method of claim 1, wherein the steel powder comprises:
    Mo=0.8-1.2.

13. The method of claim 1, wherein the steel powder comprises:
    Ti=0.8-1.2.

14. The method of claim 1, wherein the steel powder comprises:
    Al=0.5-1.1.

15. The method of claim 1, wherein the steel powder comprises:
    Cu=0.02-0.04.

16. The method of claim 1, wherein the aging heat treatment is performed alone without solution annealing.

17. The method of claim 1, wherein the aging heat treatment is performed after solution annealing at a temperature exceeding 875° C.

18. A method for producing an article out of a maraging steel, comprising the steps of:
- providing a steel powder having the following composition in M-%:
- C=0.01-0.03
- Si=0.4-0.8
- Mn=0.1-0.3
- Cr=12.0-13.0
- Ni=9.5-10.5
- Mo=0.5-1.5
- Ti=0.5-1.5
- Al=0.5-1.1
- Cu=0.02-0.04
- Residual consisting of iron and smelting-induced impurities;
- forming an article from the steel powder using a powder additive production process;
- optionally solution annealing the article at a temperature exceeding 875° C.; and
- subjecting the article to an aging heat treatment to yield a hardness greater than 50 HRC and a retransformed austenite content of 4% to 8% by volume;
- wherein the hardness greater than 50 HRC is achieved both without the solution annealing, and with the solution annealing at a temperature exceeding 875° C.

19. The method according to claim 18, wherein the additive production process comprises selective laser melting (SLM), selective laser sintering (SLS), selective heat sintering (SHS), binder jetting, or the electron beam melting (EBM) method.

20. The method according to claim 18, wherein the steel powder has a grain size distribution of 10 to 60 μm and a retransformed austenite content of between 5 and 7.5 vol. %.

21. The method of claim 18, wherein the aging heat treatment is performed alone without solution annealing.

22. The method of claim 18, wherein the aging heat treatment is performed after solution annealing at a temperature exceeding 875° C.

23. A method for producing an article out of a maraging steel, comprising the steps of:
- providing a steel powder having the following composition in M-%:
- C=0.01-0.05
- Si=0.4-0.8
- Mn=0.1-0.5
- Cr=12.0-13.0
- Ni=9.5-10.5
- Mo=0.5-1.5
- Ti=0.5-1.5
- Al=0.5-1.5
- Cu= greater than zero to 0.05, and
- Residual consisting of iron and smelting-induced impurities;
  - forming an article from the steel powder using a powder additive production process;
  - optionally solution annealing the article at a temperature exceeding 875° C.; and
  - subjecting the article to an aging heat treatment to yield a hardness greater than 50 HRC and a retransformed austenite content of 4% to 8% by volume;
  - wherein the hardness greater than 50 HRC is achieved both without the solution annealing, and with the solution annealing at a temperature exceeding 875° C.

24. The method of claim 23, wherein the aging heat treatment is performed alone without solution annealing.

25. The method of claim 23, wherein the aging heat treatment is performed after solution annealing at a temperature exceeding 875° C.

* * * * *